United States Patent
Leplingard et al.

(10) Patent No.: US 6,687,046 B2
(45) Date of Patent: Feb. 3, 2004

(54) OPTICAL FIBER AMPLIFIER DEVICE AND COMMUNICATIONS SYSTEM USING THE OPTICAL FIBER AMPLIFIER DEVICE

(75) Inventors: Florence Leplingard, Versailles (FR); Dominique Bayart, Clamart (FR)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/193,310

(22) Filed: Jul. 12, 2002

(65) Prior Publication Data

US 2003/0016441 A1 Jan. 23, 2003

(30) Foreign Application Priority Data

Jul. 23, 2001 (EP) .............................................. 01440231

(51) Int. Cl.[7] ................................................. A01S 3/067
(52) U.S. Cl. ................................ 359/337.4; 359/341.1; 372/6; 372/71; 385/127
(58) Field of Search ........................ 359/337.4, 341.4; 372/6, 71; 385/127

(56) References Cited

U.S. PATENT DOCUMENTS

| | | | |
|---|---|---|---|
| 5,291,501 A | | 3/1994 | Hanna |
| 5,469,292 A | * | 11/1995 | Bjarklev et al. ............ 359/341 |
| 5,668,659 A | | 9/1997 | Sakamoto et al. |
| 5,712,941 A | | 1/1998 | Imoto et al. |
| 5,861,973 A | * | 1/1999 | Inagaki et al. .............. 359/341 |
| 5,933,271 A | | 8/1999 | Waarts et al. |
| 5,937,134 A | | 8/1999 | DiGiovanni |
| 5,970,198 A | | 10/1999 | Inagaki et al. |
| 6,081,369 A | | 6/2000 | Waarts et al. |
| 6,288,835 B1 | * | 9/2001 | Nilsson et al. ........... 359/341.3 |
| 6,445,494 B1 | * | 9/2002 | Nilsson et al. ........... 359/341.1 |
| 6,459,526 B1 | * | 10/2002 | Minelly et al. .......... 359/337.1 |
| 6,483,974 B1 | * | 11/2002 | Waarts ........................ 385/123 |

FOREIGN PATENT DOCUMENTS

| | | | |
|---|---|---|---|
| EP | 1280247 | * | 1/2003 |
| JP | 8-110535 A | | 4/1996 |

OTHER PUBLICATIONS

Bousselet et al, Electronics Letters, pp 522–3, vol. 28, #11, 5/02.*
Bousselet et al, OFCC 2002, pp 246–248, Mar. 22, 2002.*
Sakamoto T et al.: "35–DB Gain TM–Doped Zblyan Fiber Amplifier Operating at 1.65 MUM" IEEE Photonics Technology Letters, IEEE Inc. New York, US, vol. 8, No. 3, Mar. 1, 1996, pp. 349–351.
Nilsson J et al.: "Ring–doped Cladding–pumped Single–mode Three–level Fiber Laser", Optics Letters, Optical Society of America, Washington, US, vol. 23, No. 5, Mar. 1, 1998., pp. 355–357.

* cited by examiner

Primary Examiner—Nelson Moskowitz
(74) Attorney, Agent, or Firm—Wilson Sonsini Goodrich & Rosati; Kenta Suzue

(57) ABSTRACT

The invention relates to an optical fiber amplifier device with an optical signal input and output with first piece of amplifying fiber doped with lanthanide in a double-clad structure, a second piece of amplifying fiber doped with lanthanide in a ring structure and lasers for pumping the two fiber pieces with at least one pump module.

11 Claims, 3 Drawing Sheets

OPTICAL FIBER AMPLIFIER DEVICE AND COMMUNICATIONS SYSTEM USING THE OPTICAL FIBER AMPLIFIER DEVICE

The invention relates to an optical fiber amplifier device and more specifically to a double stage amplifier structure with different amplifying fibers. More specifically the invention also relates to a communications system which uses the invention of optical fiber amplifier device.

DESCRIPTION OF THE RELATED ART

An optical amplifier is a device that increases the amplitude of an input optical signal fed thereto. If the optical signal had the input to such an amplifier is monochromatic the output also will be monochromatic with the same frequency. Conventional fiber amplifier comprises a gain medium such as a glass fiber core doped with an active material into which is coupled to input signal. Excitation occurs from the absorption of optical pumping energy by the core. The optical pumping energy is within the absorption band of the active material in the core, and when the optical signal propagates through the core, the absorbed pump energy causes amplification of the signal transmitted through the fiber core by stimulated emission. Optical amplifiers are typically used in a variety of applications including but not limited to amplification of weak optical pulses such as those that have traveled through a long length of optical fiber in communication systems.

One typical example of a fiber amplifier is referred to as an erbium amplifier, and includes a silica fiber having a single-mode core doped with erbium. It is well known that an erbium optical fiber amplifier operating in its standard three level mode is capable when pumped at a wavelength of 980 nanometers of amplifying optical signals having a wavelength of 1550 nanometer. Since this wavelength is the lowest loss wavelength of conventional single-mode silica glass fibers erbium amplifiers are well suited for inclusion in fiber systems that propagate signals having wavelengths around 1550 nanometer.

In certain particular high-power ones it may be desirable to provide optical amplification using a double-clad fiber. A typical double-clad fiber has an inner core through which an optical signal is transmitted, an inner cladding surrounding the core that is of lower refractive index than the core and an outer cladding surrounding the inner cladding that has a lower refractive index than the inner cladding and is not absorbent. When using a double-clad fiber for optical amplification it is known that the optical pumping energy need not be coupled directly into the core where it will be absorbed by amplification purposes but may be coupled into the inner cladding where it propagates in various reflective trajectories through the cladding until it intersects the core. Once contacting the core pump energy is absorbed and provides stored energy in the core for stimulates emission amplification of the optical signal.

One well-known problem with the use of double-clad fibers for optical amplifiers is the fact that among the transmission modes of the pumping energy through the inner cladding are a number which never intersect the core. Because a conventional double-clad fiber has a cylindrical core surrounded by an annular inner cladding it is possible for a number of helical modes to exist within the inner cladding which travel through the inner cladding without ever intersecting the core. Since these modes never intersect the core the pump energy is not absorbed and does not contribute to the amplification of the optical signal. This had led to attempts to reduce the helical spatial modes within the inner cladding of a double-clad fiber.

The advantage of using a double-clad fiber amplifier is that a very high level of pump energy can be coupled to the fiber multi mode inner cladding. The pumping modules can included a high power laser diodes or laser array or in some examples a group of fiber lasers. One prior art is the U.S. Pat. No. 6,081,369 disclosing a double-clad fiber amplifier pumped by a group of fiber lasers.

An other attempt to improve the efficiency of power conversion is the use of optical ring doped fiber. In the U.S. Pat. No. 5,970,198 a optical fiber ring structure is disclosed which is used to improve the gain spectrum of an optical amplifier. This fiber has a center core doped with germanium and erbium and a ring region also doped with erbium. The ring region formed around the center core region so as to be radially spaced a given distance from the center core region. Especially this dopant structure can absorb pumping light at different wavelength bands and improve the behavior of the amplifying fiber.

SUMMARY OF THE INVENTION

It is therefore an objective of the present invention to provide an optical amplifying device with a high efficiency of energy conversion from pumping energy to signal energy. In accordance with an aspect of the present invention there is provided an optical fiber amplifier device with an optical signal input and output comprising a first piece of amplifying fiber doped with lanthanide in a double-clad structure and a second piece amplifying fiber doped with lanthanide in ring structure and means for pumping the fiber pieces with at least one pump module.

DETAILED DESCRIPTION OF INVENTION

Figure 1:
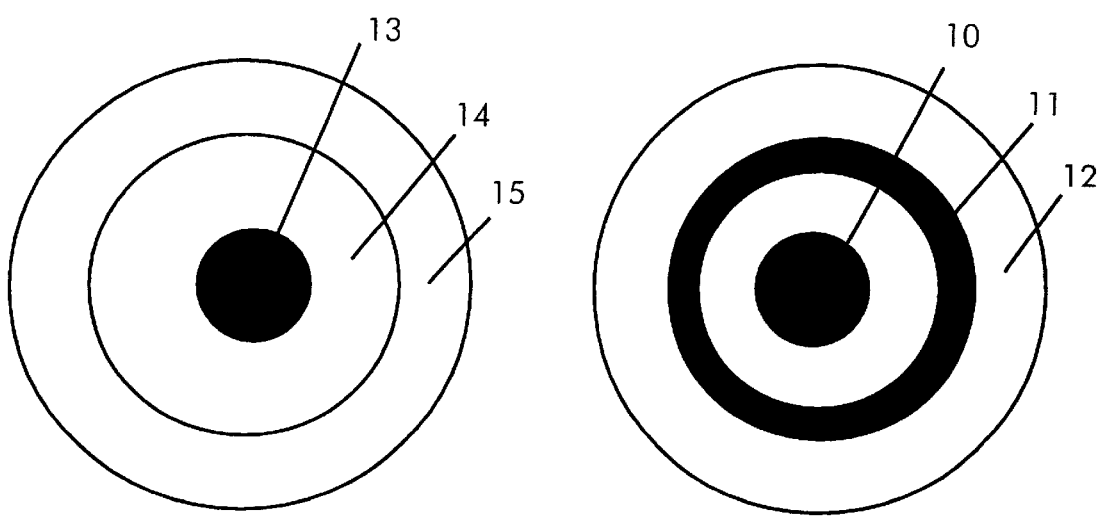
FIG. 1 is a cross-sectional schematic view of two optical fibers, one with a double-clad structure the second with a ring dopant structure.

Shown in FIG. 1 is a schematic cross-sectional view of the double-clad fiber having a particularly cladding geometry. The fiber consists of a core 13 which maybe doped with an active element such as Erbium, Ytterbium or Neodym or co-doped with such rare materials. The core functions as a transmission medium for optical signals which propagate in a longitudinal direction along the length of the fiber. The core may be any material typically used in optical fibers such as silica glass and has a first refractive index n1. Surrounding the core 13 is a inner cladding layer 14 which has a second refractive index n2 typically lower than that of the core. Same typical materials from which inner cladding 14 maybe made include a silica glass, fluoride glass or ZBLAN. The inner cladding layer 14 is surrounded by an outer cladding layer 15 which has a lower index of refraction then the inner cladding and do not absorb the signal light. Outer cladding 15 may be comprised by a polymer material or silica as it is known in the art.

The fiber construction of the double-clad fiber shown in FIG. 1 left side maybe used as a part of an optical amplifier that amplifiers an optical signal propagated through the core 13. The inner cladding layer 14 being separate from the core allows optical pumping energy to be coupled into the fiber without having to couple it into the core 13 of the fiber itself. The optical pumping energy undergoes internal reflection within the inner cladding same of the reflections resulting in pumping energy crossing into the core 13. The core which is doped in a known way with an active element is absorbent at the wavelength of the pumping energy. For example the core maybe doped with erbium ions making it absorbent at the wavelength band centered around approximately 980 nanometers. As the pumping energy is absorbed optical signal energy is added to the optical signal propagating through the core. By stimulated emission of energy stored in the doped fiber core the composition of core and inner cladding is optimized. One example for a double-clad fiber optimized for absorption of energy is disclosed in the U.S. Pat. No. 5,937,134. The right side of FIG. 1 shows the structure of an optical fiber which a ring dopant structure. The fiber includes a core region 10 and a ring region 11 radial spaced a given distance from the center core region 10. These the center core region 10 and the ring region 11 are doped with erbium. The center core 10 is the doped structure are surrounded by a cladding 12. The different glass materials for the doped region and the cladding are optimized one example is disclosed in U.S. Pat. No. 5,970,198. In this fiber structure the ring and core absorbs pump energy and converted to signal energy. In an other preferred embodiment the core of the ring structured fiber is not doped with erbium to avoid the absorption of the signal in the core.

Both fiber types are in a preferred version drawn from a glass preform which is not doped with phosphorus ions. Phosphorus doping is used in prior art for an optimization of power transfer in a co doping with ytterbium ions. Phosphorus ions limit the Erbium cross section spectra by an absorbing edge at 1535 nm. So the fiber amplifiers can not be used in the C band. A glass composition without the Phosphorus doping allows a use also in the C band.

For the production of the fiber the concentration of P in the glass is lower than 1 weight % in the fiber. Therefore, there is always some Phosphorus in the fiber. This P additive is used to make the manufacturing of the fiber easier, not to improve the power conversion efficiency of the EDFA. Without phosphorus doping means that the level of P does not increase over 1 wt % in the fiber. Such a composition is preferred. But the invention itself is not limited to this special glass composition it can be realized with any other kind of fiber composition.

Figure 2:
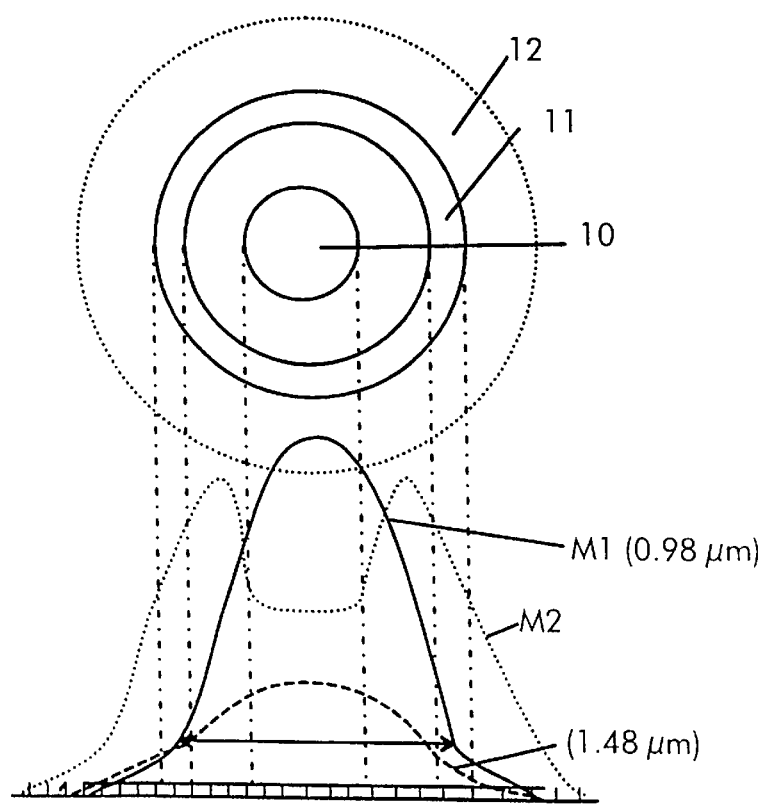
FIG. 2 shows schematic the mode field diameter of different wavelength in a ring structured fiber

FIG. 2 shows the relation to mode field distribution of pump light do to one mode and two different wavelength. It can be seen that the resulting energy level of the two different wavelength modes are absorbed differently in the ring and the center of the fiber. Especially modes of higher order as schematically shown with the mode M2 are especially absorbed in the annular structure. One objective of the invention is to use high pumping energy level which can be coupled to the cladding of the double-clad fiber also in a second part of the amplifier in the doped ring for absorbing the part of modes which are not intersect with the core of the double-clad and the ring doped fiber.

Figure 3:
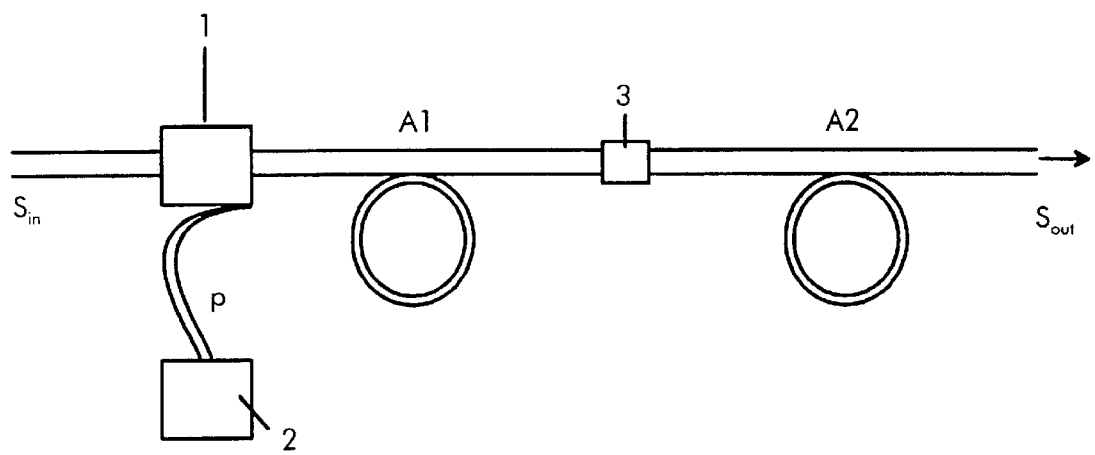
FIG. 3 is first embodiment of an optical fiber amplifying device

FIG. 3 shows a first embodiment of the inventional optical fiber amplifying device. The signal $S_{in}$ is fed to a coupler 1. The coupler 1 combines the signal input $S_{in}$ of a single mode fiber and the pumping power P of the pumping module 2 of a multimode fiber. The resulting signal is connected to a first amplifying fiber A1 which is a double-clad fiber piece. This first amplifying stage A1 is connected via a connection mean 3 which can be a splice—with ring doped amplifier A2. The resulting signal $S_{out}$ is connected to the line. For splicing the two fiber parts together the diameters of the cores and the outer cladding 14 compared with the ring dopant structure 11 must have a similar size to avoid losses of signal and pump energy.

Figure 4:
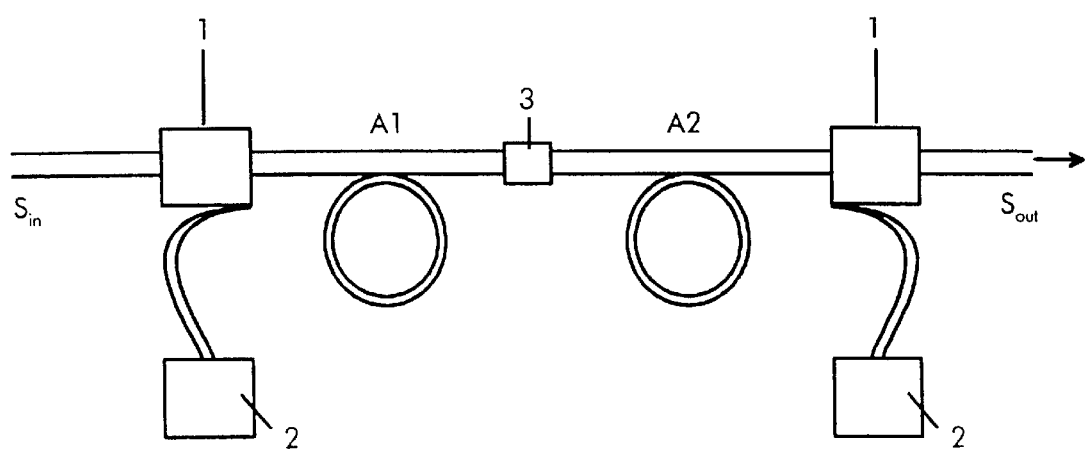
FIG. 4 is a second embodiment of the fiber optic amplifying device

FIG. 4 shows a second embodiment of the invention. In this embodiment a second coupler 1 is coupled at the output of the second amplifying stage A2. Also a second pump module 2 is coupled to the second coupler 1. With a amplifier design like this a co and counter propagating pump scheme can be realized simultaneously.

Figure 5:
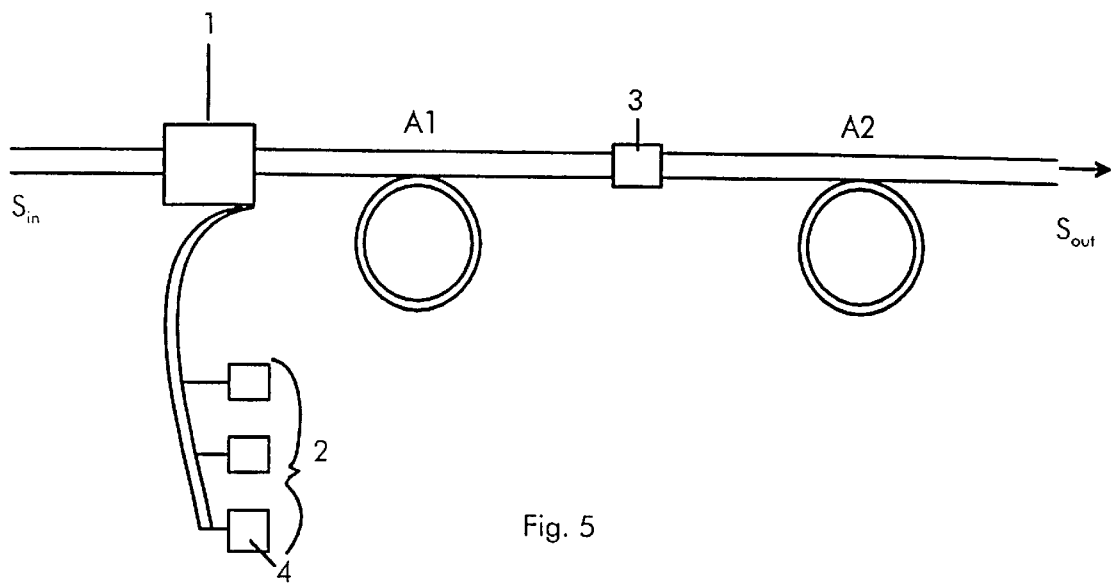
FIG. 5 shows a third embodiment.

FIG. 5 shows an other embodiment where the pump module 2 consists of a couple of laser diodes 4 with different wavelength and mode structures for an effective pumping of the fiber.

One preferred example of amplifying fibers are described in the following section. The invention is not limited to this special typed of fibers. The invention can realized with any other amplifying fiber with the features of the main claim. The fiber piece A1 has a double clad structure.

The amplifying fiber A1 is a double-clad all silica fiber with an outer diameter of 125 $\mu$m. The numerical aperture of the multimode core is 0.2 and its diameter is 32 $\mu$m. The single mode core is an alumino-germano-silicate glass doped with Er only (about 1200 ppm), with no Yb/P co-doping. Its diameter is about 8 $\mu$m. The maximum absorption of the multimode pump is 12 dB/m at 978 nm. Also double clad fibers with a multimode mode between 50 to 100 $\mu$m can be used. The form of the multimode cladding can be circular o r can have every other shape for a better coupling of modes into the core, The core diameter is about 8 $\mu$m.

The pump is a multimode laser diode whose emitting oscillating wavelengths has been optimised to match the erbium absorption spectrum peak at $\lambda$=978 nm. It is for example a single stripe 1×50 $\mu$m laser diode coupled into a 50/125 $\mu$m multimode fiber that has been micro-machined at its tip. The coupling efficiency is between 65 and 70%. The pump port of the multiplexer is made of the same multimode fiber. The pump assembly is spliced to the pump port. The pumping arrangement enables a lunched pump power of about 1.9 W.

The amplifying fiber piece A2 with the annual doping zone is directly connected to the double clad fiber. A good example of this fiber type has an annular doping with a diameter of 7 $\mu$m to 14 $\mu$m. The core has a diameter of 7 $\mu$m. All other annular doped fibers with the doped ring in the range of the multimode cladding diameter.

What is claimed is:

1. An optical fiber amplifier device with an optical signal input and output comprising a first piece of amplifying fiber doped with lanthanides in a double clad structure and a second piece of amplifying fiber doped with lanthanides in a ring structure and pumping means, including at least one pump module, for pumping the fiber pieces.

2. The optical fiber amplifier according to claim 1 where the second piece of fiber with the double clad structure has a core of optical index n1; around this core a first cladding of index n2 less than n1; and around the first cladding a second cladding of index n3 less than n2 using a composition of material without phosphorus ion doping in the core of the fiber.

3. The optical fiber amplifier according to claim 1, wherein the second piece of fiber comprises a ring region of a material composition with lanthanide doping, wherein the ring region is radially spaced a given distance from the core region using a composition of material without phosphorus ion doping in the ring zone of the fiber.

4. An optical communication system using an optical fiber amplifier device with an optical signal input and output, said optical fiber amplifier device comprising a first piece of amplifying fiber doped with lanthanides in a double clad structure and a second piece of amplifying fiber doped with lanthanides in a ring structure and pumping means, including at least one pump module, for pumping the fiber pieces.

5. The device according to claim 1, wherein the first piece of amplifying fiber and the second piece of amplifying fiber are arranged longitudinally.

6. The device according to claim 3, wherein only the ring region comprises said material composition with lanthanide doping.

7. An optical fiber amplifier device with an optical signal input and output comprising a first piece of amplifying fiber doped with lanthanides in a double clad structure and a second piece of amplifying fiber doped with lanthanides in a ring structure and a pumping device for pumping the fiber pieces.

8. An optical communication system using an optical fiber amplifier device with an optical signal input and output, said optical fiber amplifier device comprising a first piece of amplifying fiber doped with lanthanides in a double clad structure and a second piece of amplifying fiber doped with lanthanides in a ring structure and a pumping device for pumping the fiber pieces.

9. The device according to claim 1, wherein the ring structure allows absorption with respect to at least one pump mode and the double clad structure allows absorption with respect to another at least one pump mode.

10. The system according to claim 7, wherein the ring structure allows absorption with respect to at least one pump mode and the double clad structure allows absorption with respect to another at least one pump mode.

11. The system according to claim 8, wherein the ring structure allows absorption with respect to at least one pump mode and the double clad structure allows absorption with respect to another at least one pump mode.

* * * * *